(12) United States Patent
Luo et al.

(10) Patent No.: US 7,641,431 B2
(45) Date of Patent: Jan. 5, 2010

(54) FASTENING DEVICE FOR HEAT SINK

(75) Inventors: Jun Luo, Shenzhen (CN); Lei Wang, Shenzhen (CN); Cui-Jun Lu, Shenzhen (CN); Chin-Lung Chen, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 132 days.

(21) Appl. No.: 11/839,470

(22) Filed: Aug. 15, 2007

(65) Prior Publication Data

US 2009/0047097 A1 Feb. 19, 2009

(51) Int. Cl.
*F16B 21/18* (2006.01)
(52) U.S. Cl. .................. 411/353; 257/E23.084
(58) Field of Classification Search .......... 411/352, 411/353, 107, 999; 257/E23.084, E23.085
See application file for complete search history.

(56) References Cited

U.S. PATENT DOCUMENTS 3,465,803 A * 9/1969 Swanstrom et al. ......... 411/349
6,309,158 B1 * 10/2001 Bellinghausen et al. ..... 411/353
6,468,011 B2 * 10/2002 Mayer ........................ 411/353
7,315,449 B2 * 1/2008 Lewis ......................... 361/702
2003/0175091 A1 * 9/2003 Aukzemas et al. .......... 411/107
2005/0248026 A1 11/2005 So
2006/0126303 A1 6/2006 Wang et al.

* cited by examiner

*Primary Examiner*—Gary Estremsky
(74) *Attorney, Agent, or Firm*—Frank R. Niranjan

(57) ABSTRACT

A fastening device for a heat sink includes a one-piece shaft. The shaft includes a head at one end thereof, an engaging section at an opposite end thereof, a connecting section between the head and the engaging section, and a tray extending above the engaging section. A spring surrounds the connecting section between the head and the tray of the shaft. A gasket engages with the connecting section of the shaft and is retained between the spring and the tray of the shaft. In this way the shaft, the spring and the gasket are assembled. The gasket extends a downward, annular sidewall for engaging in the heat sink, by which the fastening device can be stably fixed to the heat sink. A back plate extends a nut toward the shaft for engaging with the engaging section of the shaft.

15 Claims, 4 Drawing Sheets

FASTENING DEVICE FOR HEAT SINK

BACKGROUND OF THE INVENTION

1. Field of the Invention

The present invention relates generally to fastening devices, and more particularly to a fastening device for fastening a heat sink to an electronic device to dissipate heat generated by the electronic device.

2. Description of Related Art

It is well known that, during operation of a computer, electronic devices such as central processing units (CPUs) frequently generate large amounts of heat. The heat must be quickly removed from the electronic device to prevent it from becoming unstable or being damaged. Typically, a heat sink is attached to an outer surface of the electronic device to absorb heat from the electronic device. In order to keep the heat sink to in close contact with the electronic device, a fastening device is desired.

A conventional fastening device for heat sink comprises a shaft having threads machined onto an exterior thereof and a slot defined around the shaft above the threads. A helical spring surrounds the shaft. A retaining collar tightly engages with the slot of the shaft. When it is assembled with a heat sink, the shaft of the fastening device is inserted into a through hole defined in the heat sink. The threads of the shaft pass through and are positioned under the through hole. The helical spring is located above the through hole. The shaft is pressed so that the slot of the shaft extends beyond the through hole of the heat sink. The retaining collar then holds the shaft in the slot. Here, the helical spring is deformed somewhat. Therefore, the fastening device is attached to the heat sink. When the heat sink preassembled with the fastening device is secured to an electronic device mounted on a printed circuit board, the threads of the shaft of the fastening device extend beyond a through hole defined in the printed circuit board and engage with a back plate located under the printed circuit board. The helical spring of the fastening device is deformed further and presses the heat sink to intimately contact the electronic device. However, the retaining collar is generally small, and it needs to be splayed to hold the shaft at the slot. Furthermore, it needs to press the shaft of the fastening device and overcome spring force from the helical spring to push the slot of the shaft beyond the through hole of the heat sink. This can make it difficult to assemble the fastening device with the heat sink.

What is needed, therefore, is a fastening device for a heat sink which can be conveniently assembled with the heat sink.

SUMMARY OF THE INVENTION

A fastening device for a heat sink in accordance with a preferred embodiment of the present invention comprises a shaft being integrally formed from one piece member. The shaft comprises a head at one end thereof, an engaging section at an opposite end thereof, a connecting section between the head and the engaging section, and a tray extending above the engaging section and below the connecting section. The tray has a taper circumferential periphery with a large, upper diameter and a small, lower diameter. A spring is set around the connecting section between the head and the tray of the shaft. A gasket engages with the connecting section of the shaft and is retained between the spring and the tray of the shaft, whereby the shaft, the spring and the gasket are assembled to form a unit. The gasket has an opening with a diameter smaller than the large, upper diameter of the tray. The gasket downwardly extends an annular sidewall, which has an internal diameter lager than the large, upper diameter of the tray and is engaged in a fixing hole of the heat sink, by which the fastening device can be stably fixed to the heat sink. A back plate extends a nut toward the shaft for engaging with the engaging section of the shaft when the head of the shaft is pressed downwardly and rotated, whereby the spring is compressed to downwardly push the heat sink to have an intimate contact with an electronic device mounted on a printed circuit board.

Other advantages and novel features of the present invention will become more apparent from the following detailed description when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
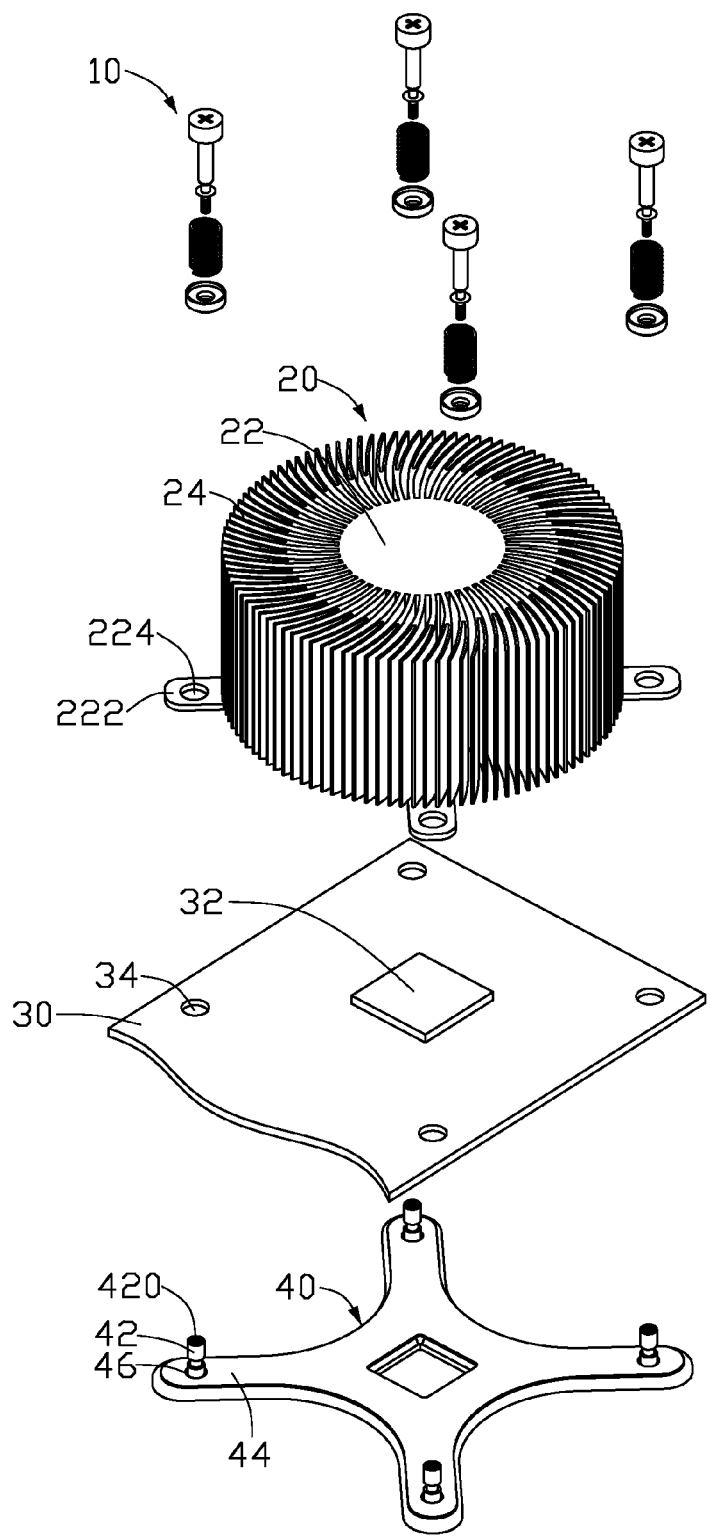
FIG. 1 is an exploded, isometric view of a fastening device for heat sink in accordance with a preferred embodiment of the present invention together with a heat sink and an electronic device mounted on a printed circuit board.
Figure 2:
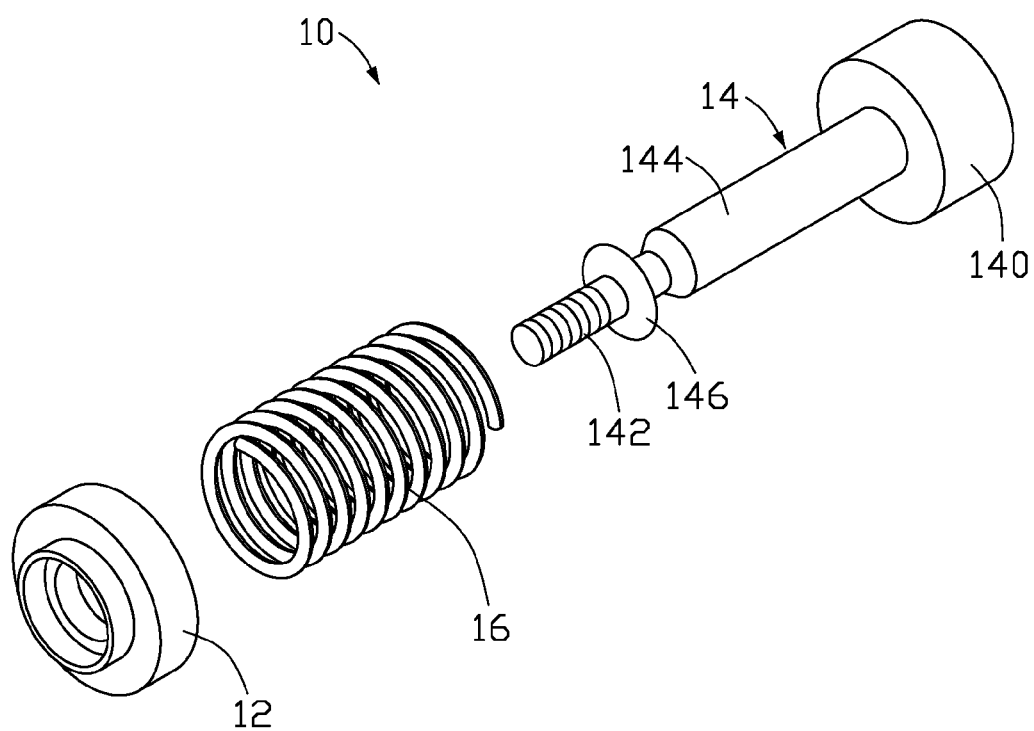
FIG. 2 shows a fastener of the fastening device of FIG. 1.
Figure 3:
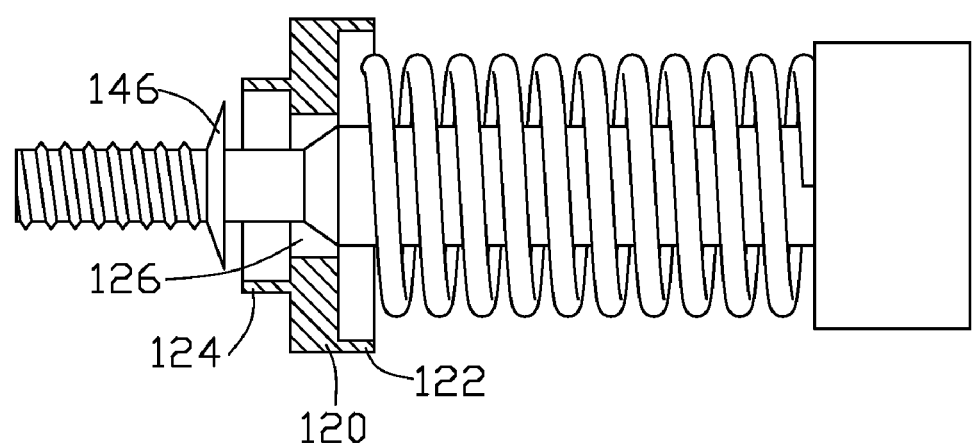
FIG. 3 is an assembled view of FIG. 3.
Figure 4:
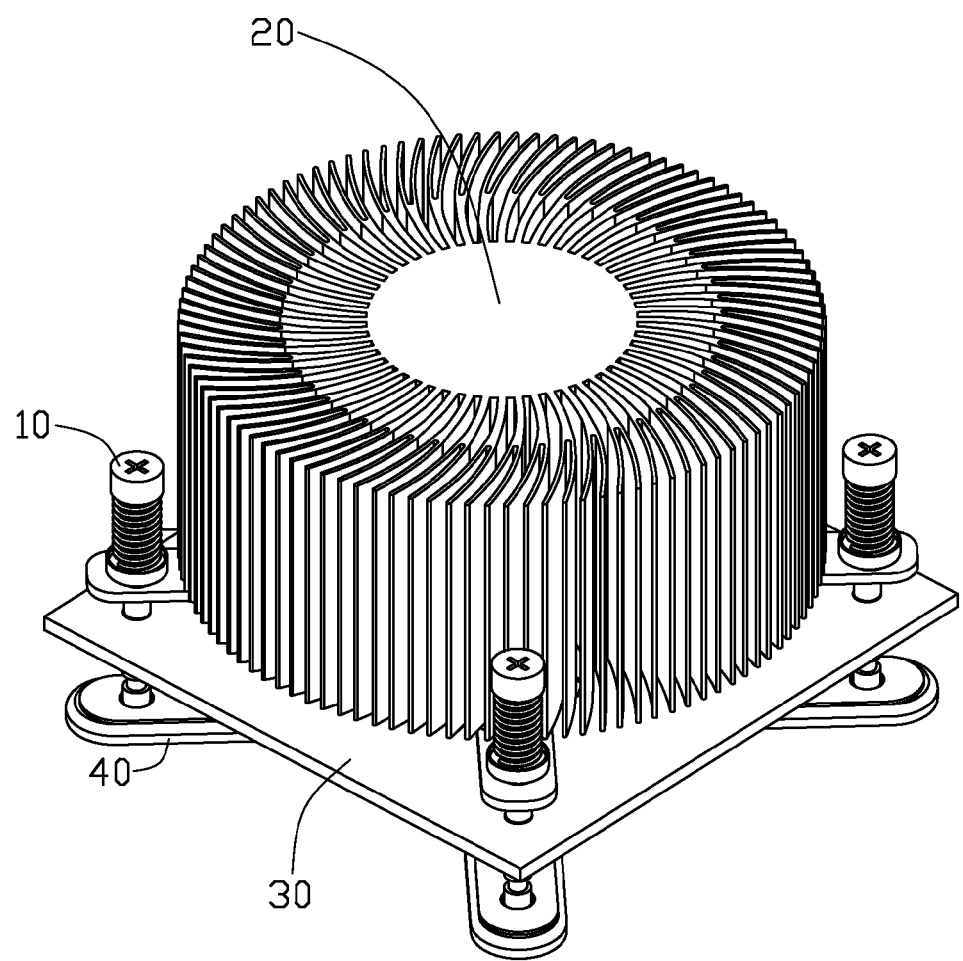
FIG. 4 is an assembled view of FIG. 1.

Referring to FIG. 1, a fastening device is shown for securing a heat sink 20 to an electronic device 32 mounted on a printed circuit board 30 to dissipate heat from the electronic device 32. The fastening device comprises four fasteners 10 and a back plate 40 located under the printed circuit board 30.

The heat sink 20 comprises a central conducting body 22 with good heat conductivity, and a plurality of fins 24 radially extending outwardly from a circumferential face of the conducting body 22. The conducting body 22 has a base (not shown) located at a bottom of the heat sink 20 for absorbing heat from the electronic device 32. Four fixing legs 222 evenly extend from a periphery of the base. Each fixing leg 222 defines a fixing hole 224 adjacent to a distal end thereof.

The back plate 40 comprises a main body (not labeled) and four arms 44 extending from four corners of the body corresponding to the fixing legs 222 of the heat sink 20. The body defines an opening in a center thereof for reducing a weight of the back plate 40. Each arm 44 extends a nut 42 upwardly toward a corresponding through aperture 34 defined in the printed circuit board 30 and a corresponding fixing hole 224 of the fixing leg 222 of the heat sink 20.

The fastener 10 comprises a shaft 14, a helical spring 16 and a gasket 12 both slidably surrounding the shaft 14.

The shaft 14 is integrally formed from a one piece member, and comprises a cylindrical head 140 at one end thereof, an engaging section 142 at an opposite end thereof, and a connecting section 144 between the head 140 and the engaging section 142. The head 140 defines a cross-shaped groove (not labeled) at a top face thereof for facilitating operation of a tool such as a screwdriver thereon. A diameter of the connecting section 144 is larger than that of the engaging section 142 but less than that of the head 140. The shaft 14 forms a taper tray 146 above the engaging section 142 but under the connecting section 144. The tray 146 has a top cross section, a bottom cross section and a taper face between the top cross section and the bottom cross section. The top cross section has a first external diameter larger than that of the connecting section 144, a screwing hole 420 of the nut 42 of the back plate 40, but less than that of the head 140 and the through hole 224 of the fix leg 222 of the heat sink 20. The bottom cross section has a second external diameter identical to that of the engaging section 142. The engaging section 142 forms a plurality of threads thereon for engaging with the nut 42 of the back plate 40.

The helical spring 16 has an internal diameter larger than the diameter of the connecting section 144 of the shaft 14 but less than the diameter of the head 140 of the shaft 14. The helical spring 16 is located between the head 140 and the tray 146 of the shaft 14.

The gasket 12 has an annular supporting plate 120 defining an opening 126 in a central portion thereof. The supporting plate 120 extends an annular first sidewall 122 upwardly from an outer edge thereof, and an annular second sidewall 124 downwardly from a bottom thereof. The supporting plate 120, the first sidewall 122 and the second sidewall 124 are coaxial. The opening 126 has a diameter larger than that of the connecting section 144 of the shaft 14 but less than the first external diameter of the tray 146 and an external diameter of the helical spring 16, thereby positioning the gasket 12 between the helical spring 16 and the tray 146 of the shaft 14. The first sidewall 122 has an internal diameter slightly larger than the external diameter of the helical spring 16 for positioning a bottom end of the helical spring 16 in a space defined by the first sidewall 122 of the supporting plate 120 when the heat sink 20 is fastened to the electronic device 32. The second sidewall 124 has an internal diameter larger than the first external diameter of the tray 146 of the shaft 14 but has an external diameter equal to the diameter of the through hole 224 of the heat sink 20.

When the fastener 10 is preassembled to the heat sink 20, the engaging section 142 and the tray 146 of the shaft 14 of the fastener 10 extend through the through hole 224 of the heat sink 20. The second sidewall 124 of the gasket 12 is engagingly received in the through hole 224 of the heat sink 20. The supporting plate 120 is located above the through hole 224. The helical spring 16 is positioned with the bottom end thereof resting on the supporting plate 120 and being surrounded by the first sidewall 122 of the gasket 12.

When assembling the heat sink 20 with the fasteners 10 to the electronic device 32, the heat sink 20 rests on the printed circuit board 30 with the base of the conducting body 22 thereof contacting the electronic device 32. Each fastener 10 has the engaging section 142 extending through the corresponding aperture 34 of the printed circuit board 30 and engaging with the corresponding nut 42 of the back plate 40. In this way, the helical spring 16 is deformed and presses the supporting plate 120 of the gasket 12 and the heat sink 20 toward the electronic device 32. Therefore, the heat sink 20 is intimately fastened to the electronic device 32.

According to the preferred embodiment of the present invention, the shaft 14 of the fastener 10 integrally forms the tray 146 above the engaging section 142. The tray 146 is formed having a taper outer face, with the first external diameter larger than that of the opening 126 of the supporting plate 120 of the gasket 12. This makes it easier for the engaging section 142 and the tray 146 to pass through the gasket 12, with the gasket 12 then being retained between the helical spring 16 and the tray 146. Therefore, the shaft 14, the helical spring 16 and the gasket 12 are assembled to form a single unit. The heat sink 20 and the fasteners 10 are assembled by simply pressing the heads 140 of the shafts 14 of the fasteners 10 to engage the second sidewalls 124 of the gaskets 12 in the through holes 224 of the heat sink 20. Additionally, the bottom of the helical spring 16 is surrounded by the first sidewall 122 of the gasket 12, thereby keeping the helical spring 16 substantially coaxial with the shaft 14.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A fastening device securing a heat sink to an electronic device mounted on a printed circuit board, the printed circuit board defining a plurality of apertures, the heat sink being disposed on an upper side of the printed circuit board and defining a plurality of fixing through holes corresponding to the apertures of the printed circuit board, respectively, the fastening device comprising:

a back plate disposed on a lower side of the printed circuit board, the back plate extending a plurality of nuts upwardly corresponding to the apertures of the printed circuit board and the fixing through holes of the heat sink, respectively; and a plurality of fasteners each comprising:

a shaft comprising a head at one end thereof, an engaging section at an opposite end thereof, a connecting section between the head and the engaging section, and a tray extending above the engaging section and below the connecting section, the tray having a taper outer surface with a large, upper diameter and a small, lower diameter;

a spring being set around the connecting section between the head and the tray of the shaft; and a gasket being set around the connecting section of the shaft, and retained between the spring and the tray of the shaft, the gasket comprising a lower, annular sidewall, the lower, annular sidewall having an internal diameter larger than the large, upper diameter of the tray and adapted for engaging in the heat sink with the engaging section extending below the heat sink;

wherein when the fastening device assembles the heat sink to the printed circuit board, the engaging section of the shaft of each of the fasteners sequentially extends through a corresponding one of the fixing through holes of the heat sink and a corresponding one of the apertures of the printed circuit board and engages in a corresponding one of the nuts of the back plate.

2. The fastening device as claimed in claim 1, wherein the shaft is formed from a one-piece member.

3. The fastening device as claimed in claim 2, wherein the head has a diameter larger than the large, upper diameter of the tray, and the large, upper diameter of the tray is larger than the connecting section of the shaft.

4. The fastening device as claimed in claim 2, wherein the gasket comprises a supporting plate defining an opening therein, the lower, annular sidewall extending downwardly from the supporting plate, the connecting section extending through the opening.

5. The fastening device as claimed in claim 4, wherein the large, upper diameter of the tray of the shaft is larger than that of the opening of the supporting plate of the gasket, and the small, lower diameter of the tray is less than that of the opening.

6. The fastening device as claimed in claim 5, wherein the engaging section of the shaft has a plurality of threads formed thereon.

7. The fastening device as claimed in claim 6, wherein the spring rests on the supporting plate of the gasket, and has a bottom surrounded by another sidewall extending upwardly from the supporting plate of the gasket.

8. The fastening device as claimed in claim 7, wherein the another sidewall of the gasket is annular, the opening of the supporting plate, the lower, annular sidewall and the another sidewall of the gasket are coaxial.

9. The fastening device as claimed in claim 1, wherein the spring has a helical shape.

10. The fastening device as claimed in claim 1, wherein the head of the shaft has a cross-shaped groove in a top thereof.

11. A fastening device securing a heat sink to a printed circuit board, the printed circuit board defining a plurality of apertures, the heat sink being disposed on an upper side of the printed circuit board and defining a plurality of fixing through holes corresponding to the apertures of the printed circuit board, respectively, the fastening device comprising:

a plurality of fasteners each comprising:

a shaft being integrally formed from a one piece member and comprising a head at one end thereof, a tray under the head, and an engaging section under the tray;

a spring set around the shaft under the head of the shaft; and a gasket engaging with the shaft and being retained between the spring and the tray of the shaft, thereby the shaft, the spring and the gasket being assembled as one piece member, the gasket extending a sidewall by which the fastening device can be stably fixed to the heat sink; and a back plate disposed on a lower side of the printed circuit board, the back plate extending a plurality of nuts each toward the shaft of a corresponding fastener for engaging with the engaging section of the shaft of the corresponding fastener.

12. The fastening device as claimed in claim 11, wherein the tray of the shaft has a tapering face between two ends thereof, the tray has one of the two ends held under the gasket when the tray extends through the gasket.

13. The fastening device as claimed in claim 11, wherein the gasket extends another sidewall opposite to the aforesaid sidewall, the spring having one end thereof surrounded by the another sidewall.

14. The fastening device as claimed in claim 13, wherein the sidewalls of gasket both are annular and coaxial.

15. The fastening device as claimed in claim 14, wherein the gasket comprises a supporting plate between the two sidewalls and defines an opening through which the tray of the shaft passes, the another sidewall, the sidewall and the opening have internal diameters thereof decreasing in the preceding order.

* * * * *